US011537712B2

(12) United States Patent
Matsuda et al.

(10) Patent No.: US 11,537,712 B2
(45) Date of Patent: Dec. 27, 2022

(54) SECURITY SYSTEM, STORAGE MEDIUM STORING COMPUTER PROGRAM, AND DATA DIAGNOSTIC METHOD

(71) Applicant: Hitachi, Ltd., Tokyo (JP)

(72) Inventors: Genki Matsuda, Tokyo (JP); Kazuya Higuchi, Tokyo (JP); Keisuke Matsumoto, Tokyo (JP); Goro Kazama, Tokyo (JP)

(73) Assignee: HITACHI, LTD., Tokyo (JP)

( * ) Notice: Subject to any disclaimer, the term of this patent is extended or adjusted under 35 U.S.C. 154(b) by 231 days.

(21) Appl. No.: 16/996,039

(22) Filed: Aug. 18, 2020

(65) Prior Publication Data
US 2021/0124826 A1 Apr. 29, 2021

(30) Foreign Application Priority Data

Oct. 29, 2019 (JP) .............................. JP2019-196161

(51) Int. Cl.
*G06F 21/56* (2013.01)
*G06F 21/62* (2013.01)
*G06F 11/14* (2006.01)
(52) U.S. Cl.
CPC ........ *G06F 21/562* (2013.01); *G06F 11/1448* (2013.01); *G06F 21/62* (2013.01); *G06F 2201/84* (2013.01); *G06F 2221/034* (2013.01)
(58) Field of Classification Search
CPC ..... G06F 21/50–568; G06F 21/60–645; G06F 11/1448; G06F 2201/84; G06F 2221/034
See application file for complete search history.

(56) References Cited

U.S. PATENT DOCUMENTS

| 10,592,352 B1 | 3/2020 | Tanaka et al. | |
|---|---|---|---|
| 2004/0225877 A1* | 11/2004 | Huang | G06F 21/552 713/100 |
| 2005/0064859 A1* | 3/2005 | Kotzin | H04M 3/42 455/418 |
| 2007/0104007 A1* | 5/2007 | Mizuno | H04N 1/448 365/221 |
| 2011/0289584 A1* | 11/2011 | Palagummi | G06F 21/562 726/24 |
| 2017/0060884 A1 | 3/2017 | Goodman et al. | |
| 2018/0048657 A1* | 2/2018 | Hittel | G06F 21/565 |

(Continued)

FOREIGN PATENT DOCUMENTS

JP 2018-147127 A 9/2018

OTHER PUBLICATIONS

Japanese Office Action received in corresponding Japanese Application No. 2019-196161 dated Oct. 26, 2021.

*Primary Examiner* — Madhuri R Herzog
(74) *Attorney, Agent, or Firm* — Mattingly & Malur, PC

(57) ABSTRACT

A security system includes a backup acquisition unit configured to store given information indicating states of backup data together with backup images generated from the backup data for each backup generation; and a determination unit configured to generate, when a predetermined timing comes, determination information for determining whether there is an abnormality in the stored backup data, based on a predetermined determination rule and the given information for each backup generation, and to output the generated determination information.

11 Claims, 15 Drawing Sheets

(56) References Cited

U.S. PATENT DOCUMENTS

2018/0253358 A1    9/2018  Gu
2019/0042744 A1*  2/2019  Rajasekharan ....... G06F 21/554
2019/0236274 A1*  8/2019  Brenner ............. G06F 21/6245

* cited by examiner

FIG. 6

| | | | File metadata D3_FL | | | | |
|---|---|---|---|---|---|---|---|
| FL.1 | FL.2 | FL.3 | FL.4 | FL.5 | FL.6 | FL.7 | FL.8 |
| Backup ID | Host name | File path | Update date | Size (byte) | Permissions | File type | Fingerprint |
| 001 | Host01 | A.Txt | 2019/1/1 | 20,000 | 644 | regular_file | 2729130263000e7ae9b5e2d51ff138e674 |
| 001 | Host01 | B.txt | 2019/1/1 | 20,100 | 644 | regular_file | 2729130263000e7ae9b5e2d51ff138e675 |
| 001 | Host01 | C.txt | 2019/1/2 | 20,100 | 644 | regular_file | 2729130263000e7ae9b5e2d51ff138e682 |
| ... | ... | ... | ... | ... | ... | ... | |
| 001 | Host02 | D.txt | 2019/1/3 | 10,000 | 644 | regular_file | 2729130263000e7ae9b5e2d51ff138e441 |
| 001 | Host02 | E.txt | 2019/1/5 | 11,000 | 644 | regular_file | 2729130263000e7ae9b5e2d51ff138e123 |
| ... | ... | ... | ... | ... | ... | ... | |

FIG. 7

Process metadata D3_PR

| Backup ID | Host name | Process list |
|---|---|---|
| 001 | Host01 | {"watchdog", "watchdog", "bash", "kworker", "kthreadd", "migration", "kdevtmpfs" ...} |
| 001 | Host02 | {"watchdog", "watchdog", "netns", "kworker", "ksoftirqd", "kworker", "xfsalloc" ...} |
| ... | ... | ... |

PR1 — Backup ID
PR2 — Host name
PR3 — Process list

FIG. 8

| | | | | | User metadata D3_US |
|---|---|---|---|---|---|
| US1 | US2 | US3 | US4 | US5 | US6 |
| Backup ID | Host name | User name | User ID | Primary group | Secondary group list |
| 001 | Host01 | user01 | 101 | group01 | [group02, group03] |
| 001 | Host01 | user02 | 102 | group04 | [group05, group06, group07] |
| ... | ... | ... | ... | ... | ... |
| 001 | Host02 | user03 | 103 | group08 | ["group09"] |
| 001 | Host02 | user04 | 104 | group10 | [] |
| ... | ... | ... | ... | ... | ... |

FIG. 9

| Listening port metadata D3_LP |||
| LP1 | LP2 | LP3 |
| Backup ID | Host name | Port list |
| 001 | Host01 | [8080] |
| 001 | Host02 | [5601, 9200] |
| ... | ... | ... |

SECURITY SYSTEM, STORAGE MEDIUM STORING COMPUTER PROGRAM, AND DATA DIAGNOSTIC METHOD

CROSS-REFERENCE TO RELATED APPLICATION

The present application claims priority from Japanese application JP 2019-196161, filed on Oct. 29, 2019, the contents of which is hereby incorporated by reference into this application.

BACKGROUND

The present invention relates to a security system, a storage medium storing a computer program, and a data diagnostic method.

In recent years, malware attacks on computers have become diversified and sophisticated, and DeOS (Destruction of Service) attacks that destroy backup data have also appeared. Countermeasures such as cyber resilience that can respond early to such cyber attacks advancing year after year have been considered on the assumption that malware will penetrate.

Conventionally, a backup of data is stored, and the state of a computer file system is restored to the state at a specific time point by using the metadata of the backup data and the backup data (see U.S. Patent Application Publication No. 2017/0060884, for example).

SUMMARY

When a business computer is infected with malware, it is necessary to recover it immediately, but it is effort and time-consuming for a user such as a system administrator to select safe backup data that is not infected with malware and restore it manually. It takes a lot of effort for the user to manually restore a lot of backups one by one to check their contents, but it depends on the frequency and size of the backups, and it also takes a long time to restore them, resulting in a deterioration in service quality due to suspension of business for a long time.

The present invention has been made in view of the above problems, and an object the present invention is to provide a security system, a storage medium storing a computer program, and a data diagnostic method which are capable of determining whether there is an abnormality in backup data without restoring the backup data.

In order to solve the above problems, a security system according to one aspect of the present invention includes a backup acquisition unit configured to store given information indicating states of backup data together with backup images generated from the backup data for respective backup generations; and a determination unit configured to generate, when a predetermined timing comes, determination information for determining whether there is an abnormality in the stored backup data, based on a predetermined determination rule and the given information for the respective backup generations, and to output the generated determination information.

According to the present invention, it is possible to obtain the determination information for determining whether there is an abnormality in the stored backup data, based on the given information indicating the states of the backup data and the predetermined determination rule.

BRIEF DESCRIPTION OF THE DRAWINGS

FIG. 6 is an explanatory diagram of file metadata;

FIG. 7 is an explanatory diagram of process metadata;

FIG. 8 is an explanatory diagram of user metadata;

FIG. 9 is an explanatory diagram of listening port metadata;

DETAILED DESCRIPTION OF THE EMBODIMENT

Figure 1:
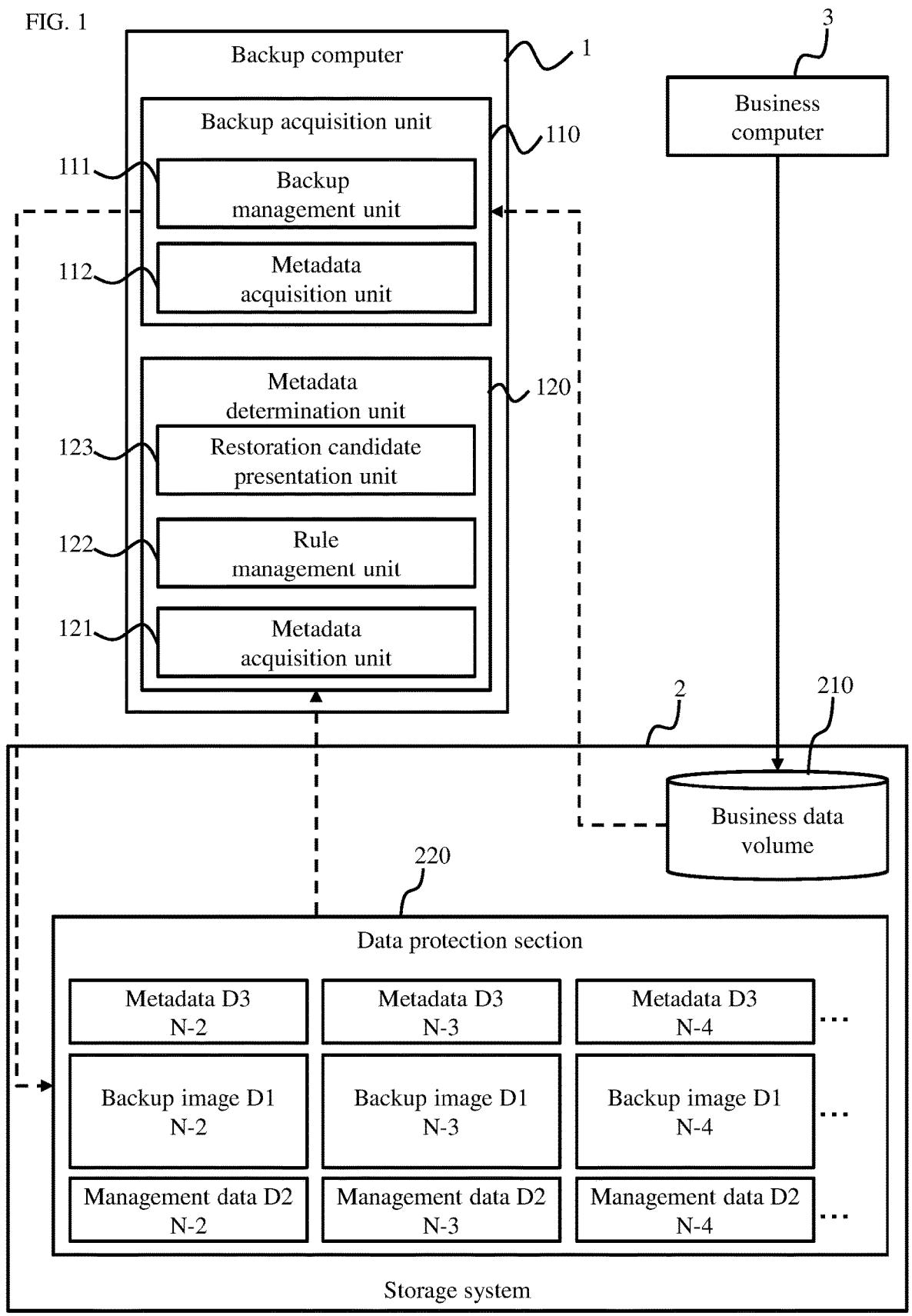
FIG. 1 is an overall schematic diagram of a security system.

Embodiments of the present invention will be described below with reference to the drawings. A security system according to the present embodiments acquires, before an image of backup data is compressed and stored, metadata which is an attribute of the backup data, as "given information", and performs processing of storing the acquired metadata and the backup image in association with each other in a safe protected area for each backup generation. The reason why the metadata indicating the state of the backup data that is the source of the backup image is acquired before the backup image is generated is that preparing the metadata in advance reduces the time required for determination processing described below, and that necessary metadata may fail to be acquired from the backup image.

When the data targeted for backup (the data or computer program used by a business computer) is infected with malware such as a computer virus and thus a failure occurs in the operation of the business computer, the security system determines that a predetermined timing has come and reads a piece of metadata corresponding to each piece of backup data from the protected area.

The security system generates determination information that can be used to determine whether there is an abnormality in the backup data from a difference between pieces of metadata based on a predetermined determination rule. For example, if the predetermined determination rule is a rule that focuses on "file update date", which is one of predetermined parameters, it is possible to infer that a file updated at an unexpected date and time is a file infected with malware.

In this case, the security system presents as the "determination information" information for identifying the backup data infected with the malware or information for identifying the backup data of the previous generation to the user.

The user designates one or more pieces of backup data which are candidates for restoration based on the information presented by the security system, and restores the backup data. The user checks the safety of the restored data by using a security check program or the like, and selects as a candidate for restoration the latest piece of data from among pieces of data whose safety has been confirmed.

The predetermined parameters to be specified by the predetermined determination rule can be changed according to the type of backup data. For example, for data files other than computer programs, only basic information such as data size, update date, and fingerprint is managed as the predetermined parameters, and for computer program files, detailed information other than the basic information, such as a list of running processes, a list of users, a list of listening ports, and registries, can be included in the predetermined parameters together with the basic information.

Furthermore, intermediate information corresponding to an intermediate between the basic information and the detailed information may be defined as a predetermined parameter.

Furthermore, a predetermined parameter to be monitored can be set according to the type of data file such as image file, sound file, or text file.

In the embodiments having such a configuration, since the given information indicating the state of the backup data is stored in advance in association with the backup image, it is possible to generate and present to the user the determination information for assisting the determination in selecting the candidates for restoration, based on the given information and the predetermined determination rule, even when the business computer that uses the original data of the backup data is infected with malware. Therefore, in the embodiments, it is possible for the user to quickly specify a backup image that is estimated to be safe and restore it to the backup data, and to restore the backup data after confirming the safety of the backup data, without needing to manually restore the backup images in order from the latest generation to check the safety. Accordingly, in the embodiments, it is possible to reduce the time required for recovery when a failure occurs, and improve the convenience for the user.

First Embodiment

A first embodiment will be described with reference to FIGS. 1 to 12. FIG. 1 is an overall schematic diagram of a security system according to the present embodiment. The security system includes, for example, a backup computer 1 and a storage system 2.

The security system of the present embodiment does not include a business computer 3. Nevertheless, a system including the backup computer 1, the storage system 2, and the business computer 3 can be defined as the security system. The functions of the backup computer 1 may be provided in the storage system 2 as in another embodiment described below.

The backup computer 1 includes, for example, a backup acquisition unit 110 and a metadata determination unit 120. The backup acquisition unit 110 includes, for example, a backup management unit 111 and a metadata acquisition unit 112. The metadata determination unit 120 includes, for example, a metadata acquisition unit 121, a rule management unit 122, and a restoration candidate presentation unit 123.

The backup acquisition unit 110 has a function of acquiring a backup of business data (data to be backed up) used by the business computer 3 and metadata of the backup, and storing them in the storage system 2.

The backup management unit 111 generates and manages management data D2 for managing a backup image D1 generated from the backup data. The management data can also be called ledger data. The management data is, for example, data used for restoration such as date and time when the backup was acquired and backup generation.

The metadata acquisition unit 112 has a function of acquiring metadata D3 indicating the state of the backup data when the backup image D1 is generated from the backup data. The acquired metadata D3 is stored in a data protection section 220 of the storage system 2 in association with the backup image D1 and the management data D2.

When a failure (fault) occurs in the business computer 3 and accordingly it becomes necessary to find safe backup data, the metadata determination unit 120 reads pieces of metadata D3 of the respective backup generations stored in the data protection section 220 of the storage system 2, performs determination on each read piece of metadata D3 by using a predetermined determination rule, and presents backup images D1 which can be candidates for restoration to the user.

When a predetermined timing comes, the metadata acquisition unit 121 reads the metadata D3 of each backup generation stored in the data protection section 220, and stores it in a metadata table.

The rule management unit 122 manages a determination rule specified by a user (hereinafter sometimes abbreviated as a rule) or a determination rule automatically selected.

The restoration candidate presentation unit 123 identifies a backup image D1 estimated to be highly safe by examining the differences between the pieces of metadata D3 of the respective backup generations based on the rule, and presents the backup image D1 as a candidate for restoration to the user.

The storage system 2 provides storage areas for the business computer 3 and the backup computer 1. The storage system 2 includes, for example, a business data volume 210 that stores business data, and the data protection section 220.

The data protection section 220 is a storage area that is not normally associated with a communication port (not illustrated) of the storage system 2. In other words, the data protection section 220 is a safe storage area that is normally inaccessible from an external device (such as the backup computer 1).

In the data protection section 220, the backup image D1, the management data D2, and the metadata D3 for each backup generation are stored. Throughout the drawings, the generation of the data currently in use is referred to as "N", the previous generation as "N–1", the second previous generation as "N–2", and the third previous generation as "N–3".

A system configuration diagram of the security system will be described with reference to FIG. 2. The backup computer 1 is, for example, a computer system including a microprocessor (CPU: Central Processing Unit) 11, a memory 12, an interface (IF) 13, and a user interface (UI) 14.

The memory 12 will be described as including a main storage device and an auxiliary storage device. In the memory 12, a given computer program for implementing each function of the backup acquisition unit 110 and the metadata determination unit 120 described with FIG. 1 is stored. The functions 110 and 120 as a security system are implemented by the microprocessor 11 reading the given computer program from the memory 12 to execute the program.

The interface 13 is a device for communicating with the storage system 2 and the business computer 3 via a communication network CN. The user interface 14 is a device for exchanging information between a user such as a system administrator and the backup computer 1. The user interface 14 includes an information input device and an information output device. Examples of the information input device include a keyboard, a touch panel, and a voice input device. Examples of the information output device include a monitor display, a printer, and a voice synthesizer. The backup computer 1 can also notify a user such as a system administrator of information with a digital message such as an electronic mail.

A storage medium MM is configured like a flash memory or a hard disk, for example. The storage medium MM is coupled to the backup computer 1 to input and output computer programs and data to and from the backup computer 1. Specifically, all or part of the computer programs and data in the memory 12 can be copied to the storage medium MM and distributed through the storage medium MM. Alternatively, all or part of the computer programs and data stored in the storage medium MM can be transferred to the memory 12 of the backup computer 1 and stored therein. Furthermore, all or part of the computer programs and data in the memory 12 can be transferred to another computer or another storage device via the communication network CN.

The communication network CN couples the backup computer 1, the storage system 2, and the business computer 3 so that they can bidirectionally communicate with each other. The communication network CN is, for example, a LAN (Local Area Network). The communication network CN may be a private line network or a public line network.

The storage system 2 includes, for example, a controller 20 and a plurality of storage devices 21. As the plurality of storage devices 21, for example, various drives capable of reading and writing data can be used such as a hard disk device, a semiconductor memory device, an optical disk device, and a magneto-optical disk device. Further, as the plurality of storage devices 21, for example, various storage devices can be used such as a flash memory, an FeRAM (Ferroelectric Random Access Memory), an MRAM (Magnetoresistive Random Access Memory), and a phase-change memory. Further, the plurality of storage devices 21 may be configured, for example, in which different types of storage devices are mixed.

The storage areas of the plurality of storage devices 21 form a logical group 22, and a logical volume (logical storage device) 23 is configured in the storage area of the logical group 22. The logical volume 23 is provided to the business computer 3 by being associated with a communication port (not illustrated) of the controller 20.

Figure 2:
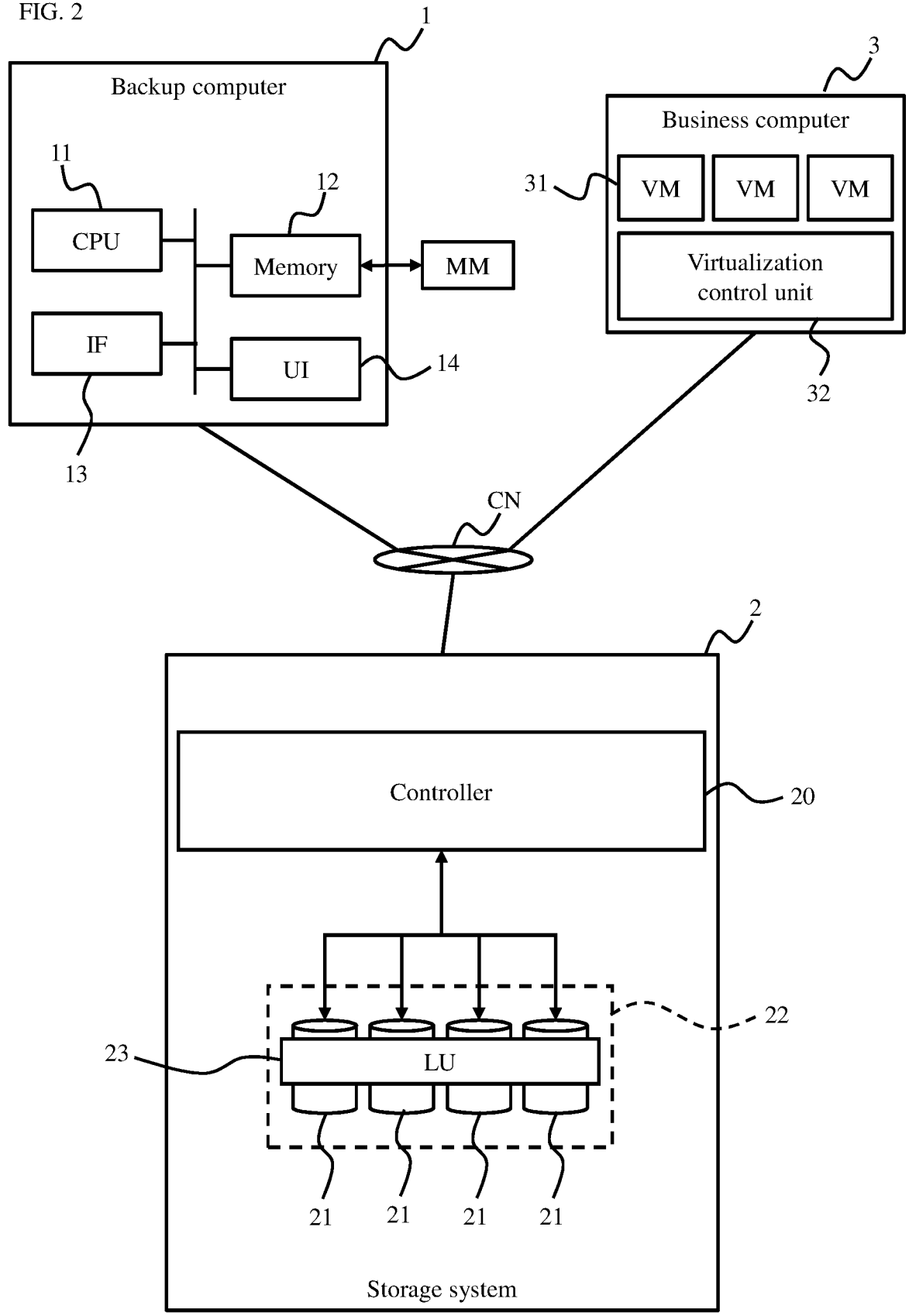
FIG. 2 is a system configuration diagram of the security system.

Although only one logical volume 23 is illustrated in FIG. 2, a plurality of (many) logical volumes 23 are actually generated. One or more of the logical volumes of the storage system 2 are used as the business data volume 210 by the business computer 3. Further, as described with FIG. 3, the other logical volumes 23 of the storage system 2 are used as, for example, a backup image volume 230, a temporary volume 240, a ledger volume 250, an access volume 260, and copy volumes 221 and 222.

The controller 20 controls the operation of the storage system 2. The controller 20 includes, for example, a higher-level communication unit for communicating with the business computer 3 and the backup computer 1 which serve as host devices, a lower-level communication unit for communicating with each storage device 21, a plurality of microprocessors, and a cache memory, and a shared memory, which are all not illustrated.

The business computer 3 is a computer that reads and writes data from and to the business data volume 210 of the storage system 2. The business computer 3 includes, for example, a plurality of virtual machines 31, a virtualization control unit 32 that controls the operation of each virtual machine 31, a memory (not illustrated), and the like. The business computer 3 is provided with various applications (not illustrated) such as an accounting system, a customer management system, and an order management system, and accesses the business data volume 210 in response to a request from the application(s).

Note that, although one business computer 3 is illustrated throughout the drawings, a plurality of business computers 3 can use one storage system 2. Further, one business computer 3 can use a plurality of business data volumes 210 in one storage system 2, or a plurality of business computers 3 can share one business data volume 210 in one storage system 2.

Figure 3:
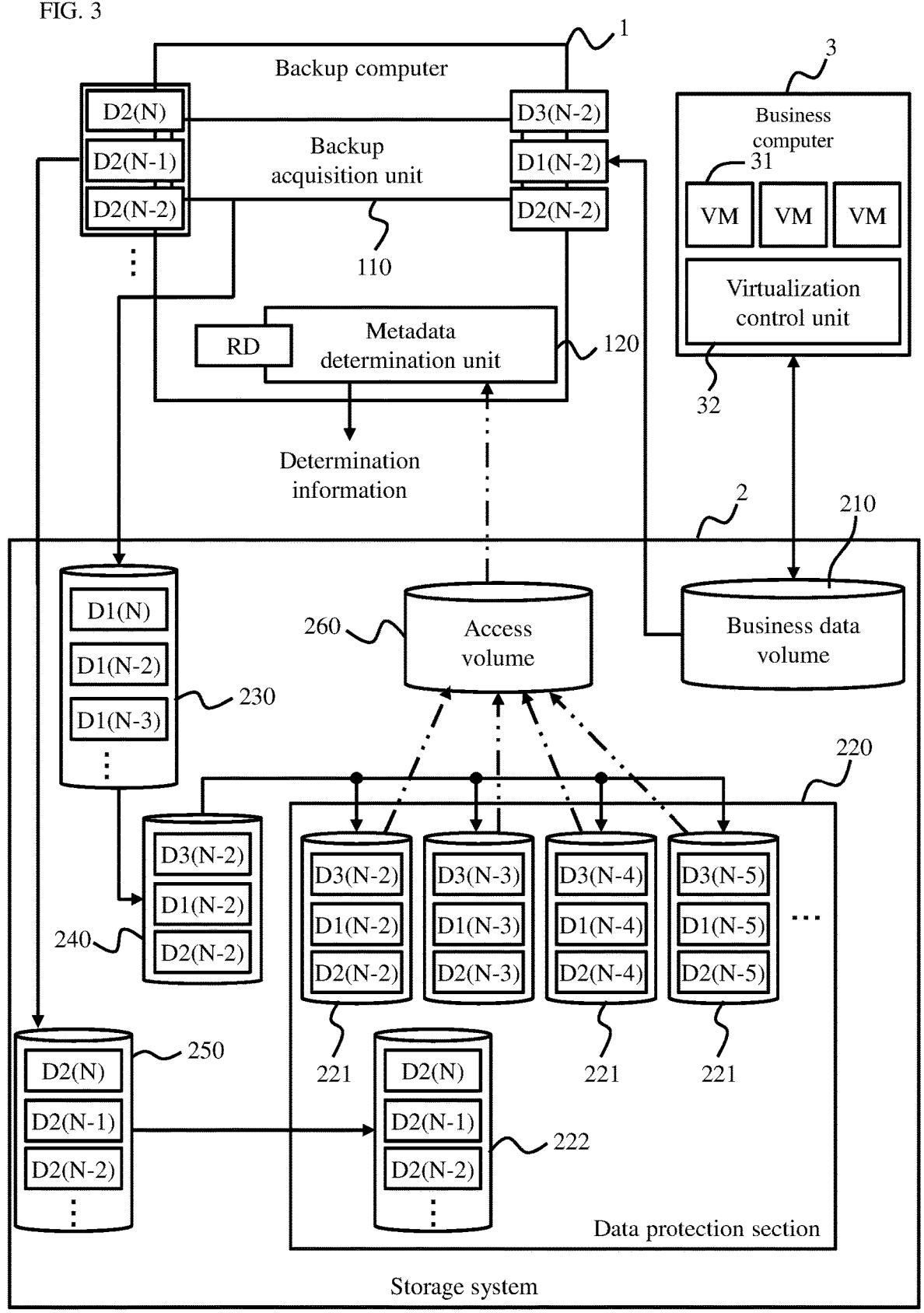
FIG. 3 is an explanatory diagram of the security system.

The outline of the operation of the security system will be described with reference to FIG. 3. When a predetermined time elapses or a predetermined amount of data is updated, a backup is acquired for the business data to be backed up stored in the business data volume 210. The backup acquisition unit 110 of the backup computer 1 acquires a copy of the business data as backup data and generates a backup image D1. When generating the backup image D1, the backup acquisition unit 110 generates management data D2 for managing the backup image D1 and metadata D3 indicating a state of the backup data which is the source of the backup image.

The backup acquisition unit 110 stores the generated backup image D1 in the backup image volume 230. The backup acquisition unit 110 stores the generated management data D2 in the ledger volume 250.

The controller 20 of the storage system 2 copies the backup image D1 stored in the backup image volume 230, the management data D2 stored in the ledger volume 250, and the metadata D3 of the backup image D1 into a temporary volume 240.

The controller 20 generates a copy volume 221 corresponding to the temporary volume 240 in the data protection section 220, and makes a copy pair of the temporary volume 240 and the copy volume 221. Then, the controller 20 transfers the backup image D1, the management data D2, and the metadata D3 in the temporary volume 240 from the temporary volume 240, which is the copy source volume, to the copy volume 221, which is the copy destination volume, and stores them therein. When copying is completed, the copy pair is canceled. The temporary volume 240 is reused for the next backup. As a result, the data protection section 220 stores a copy volume 221 for each backup generation.

Further, the controller 20 generates a copy volume 222 of the ledger volume 250 in the data protection section 220, and protects each piece of management data D2 serving as ledger data. This is because the backup cannot be restored based on the backup image D1 without safe management data D2.

On the other hand, when it is detected manually or automatically that the business computer 3 is infected with malware, the backup computer 1 is notified of that detection. The metadata determination unit 120 of the backup computer 1 sequentially couples the copy volumes 221 of the respective backup generations in the data protection section 220 to the access volume 260 to read the pieces of metadata D3 stored in the copy volumes 221.

An access path between the access volume 260 and the backup computer 1 is configured. However, in the storage system 2, the access path between each copy volume 221 in the data protection section 220 and the access volume 260 is not normally configured. An access path is temporarily configured between the access volume 260 and the copy volume 221 only when the metadata of each backup generation is read to extract candidates for restoration.

Note that the temporary volume 240 is a volume that is temporarily used only when a backup is copied into the data protection section 220, and the access path between the temporary volume 240 and the copy volume 221 will disappear when the copy pair is canceled. Accordingly, the data protection section 220 is normally isolated from the outside in the storage system 2.

The metadata determination unit 120 calculates differences between the pieces of metadata of the respective backup generations based on at least one of a rule RD set by the user or a rule RD automatically selected, and generates, from the calculated differences, determination information for determining whether there is an abnormality in the backup image D1 (i.e., whether there is an abnormality in the backup data). The determination information may include, for example, a message such as "Backups older than backup ID=00015 would be safe in light of rule number R1". Note that the metadata determination unit 120 does not always need to acquire the pieces of metadata for all backup generations, but may acquire pieces of metadata for backup generations within a range specified by either the user or a computer program that specifies the acquisition range.

Figure 4:
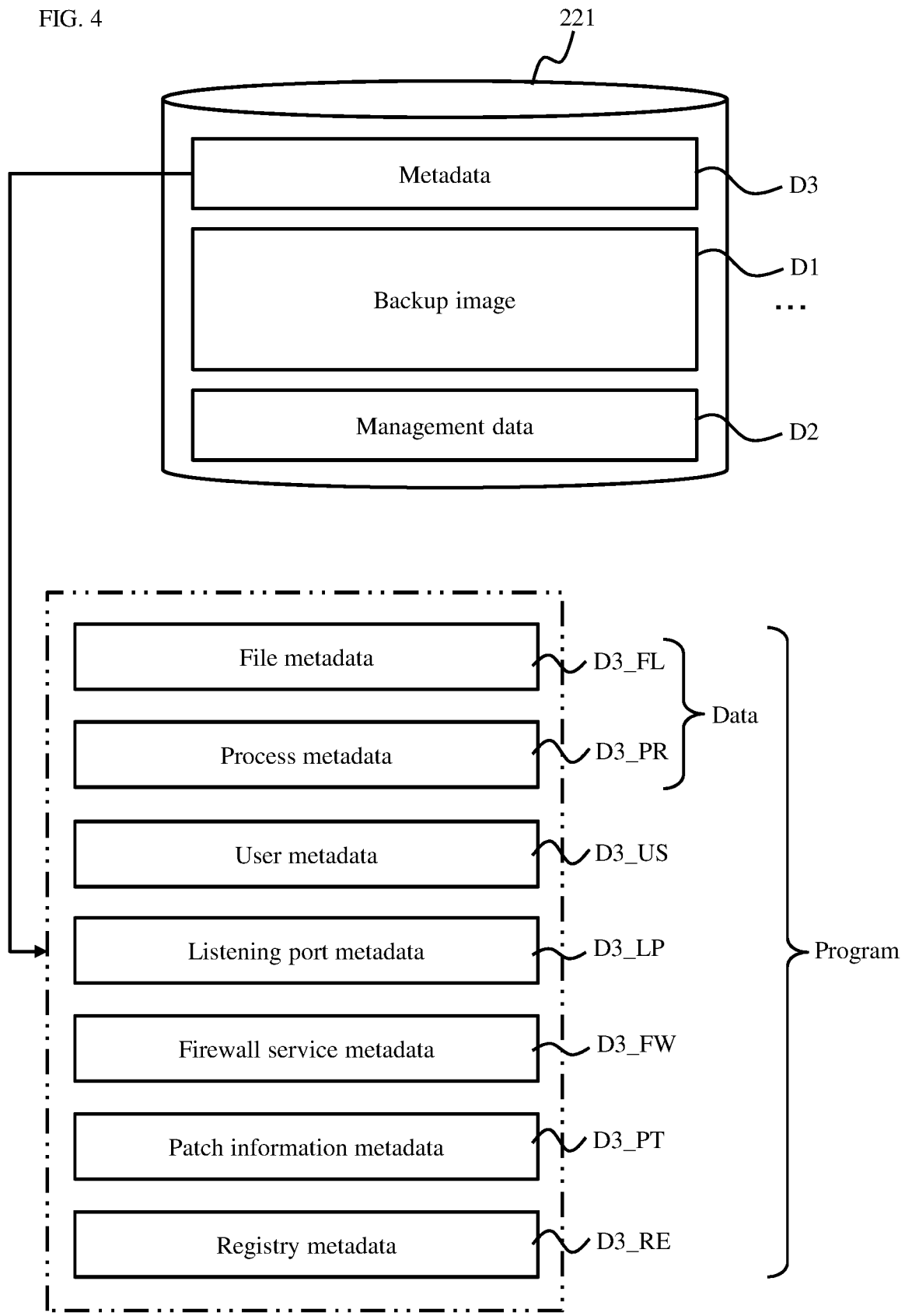
FIG. 4 is an explanatory diagram illustrating storage contents of a volume and contents of metadata which are stored in a data protection section.

A storage content of the volume 221 and a content of the metadata D3 which are stored in the data protection section 220 will be described with reference to FIG. 4.

As described above, each copy volume 221 in the data protection section 220 stores the acquired backup image D1, the management data D2 of the backup image D1, and the metadata D3 indicating a state of the backup data which is the source data of the backup image D1. Note that the backup image D1 is compressed.

The metadata D3 is, for example, file metadata D3_FL which is the metadata of a file, process metadata D3_PR which is the metadata of a process, user metadata D3_US which is the metadata of a user who uses the file, listening port metadata D3_LP which is the metadata of a listening port used for the file, firewall service metadata D3_FW which is the metadata of a firewall service, patch information metadata D3_PT which is the metadata of patch information, and registry metadata D3_RE which is the metadata of a registry.

The details of the metadata D3 described above are examples, and the present embodiment is not limited to the above-described metadata. A piece of metadata other than the above-mentioned pieces of metadata may be adopted, or some of the above-mentioned pieces of metadata may not be used.

Furthermore, the type of metadata to be acquired can be changed according to the type of backup data. For example, for a data file, the file metadata D3_FL and the process metadata D3_PR are acquired. For a program file, at least one or more of the remaining pieces of metadata D3_US, D3_LP, D3_FW, D3_PT, and D3_RE can also be acquired.

Figure 5:
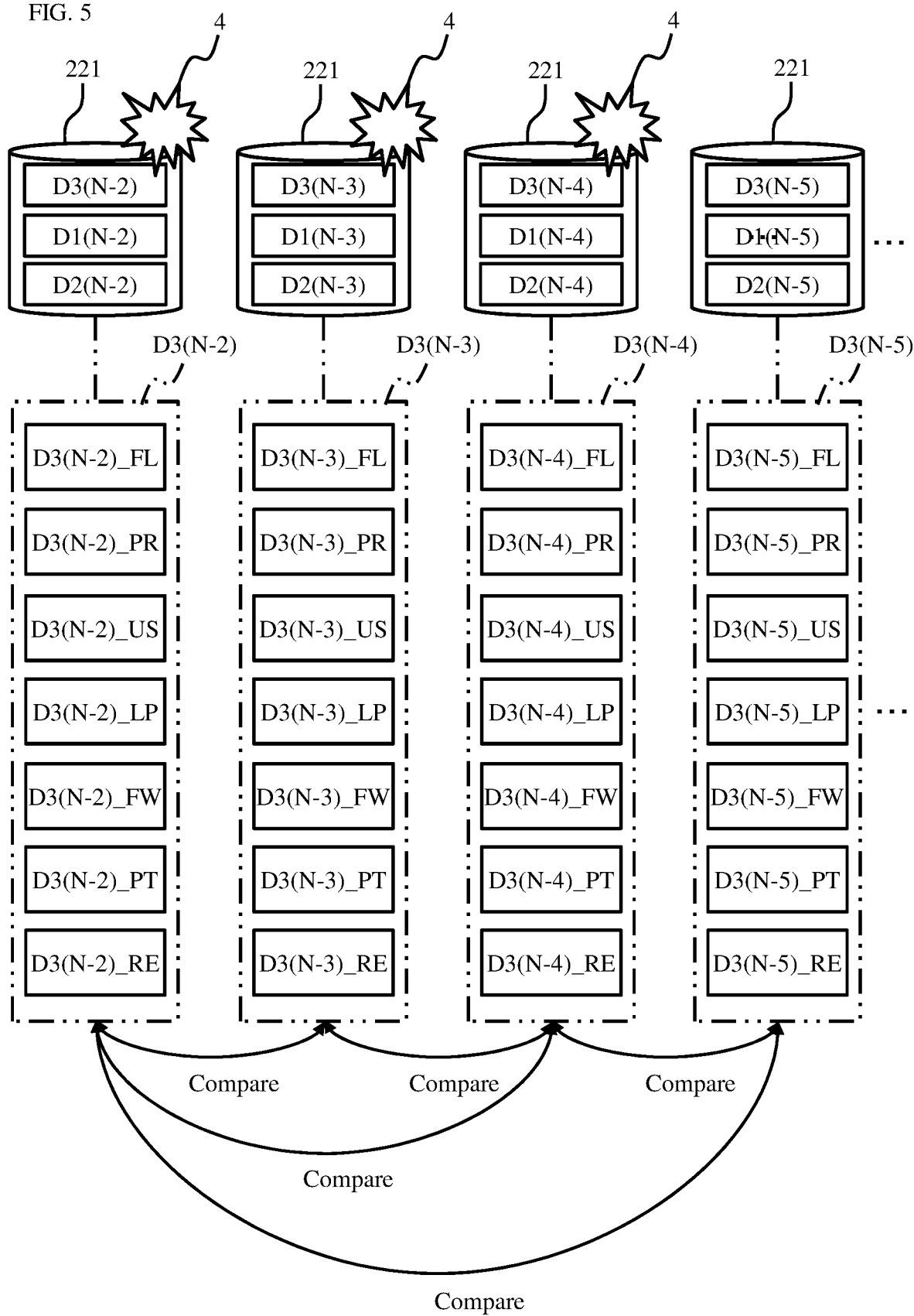
FIG. 5 is an explanatory diagram illustrating a method for checking whether there is an abnormality by obtaining a difference between pieces of metadata by comparing them.

A method for checking whether there is an abnormality by obtaining a difference between the pieces of metadata by comparing them will be described with reference to FIG. 5. In the order from left to right, arranged are a volume storing a backup of the second previous generation, a volume storing a backup of the third previous generation, a volume storing a backup of the fourth previous generation, and a volume storing a backup of the fifth previous generation.

Here, it is assumed that the business data is infected with malware 4 when the backup of the fourth previous generation is acquired. Comparing the pieces of metadata D3 corresponding to the pieces of backup data of the respective generations to make a comprehensive determination makes it possible to infer that the backup of the fourth previous generation is infected with the malware and the backup of the fifth previous generation is not infected with the malware, but it depends on the type of the malware 4 and the like.

Here, a determination rule is provided for each of the types of pieces of metadata D3. Specifically, the determination rule can be set for each parameter of each piece of metadata D3. For example, for "file update date" of the file metadata D3_FL, for example, if it is different from the update dates of other files before and after the target file, it can be suspected that the backup has been infected with the malware 4. Further, for example, for "user name" of the user metadata D3_US, when a new user name is registered, it can be suspected that the backup has been infected with the malware 4. Further, for example, when a new port number is registered in "port list" of the listening port metadata D3_LP, it can be determined that the malware 4 has planted a backdoor in the backup.

Checking the differences between the pieces of metadata based on the determination rule makes it possible to tentatively estimate whether or not the backup is infected with the malware 4, and thus to quickly narrow down the range of normal backups that are not infected. The user can restore some backups based on the determination information presented by the security system, and check the safety with a security check program or the like.

Examples of the metadata D3 will be described with reference to FIGS. 6 to 9. FIG. 6 illustrates an example of the file metadata D3_FL. The file metadata D3_FL includes, for example, a backup ID FL1, a host name FL2, a file path FL3, update date FL4, a size FL5, permissions FL6, a file type FL7, and a fingerprint FL8. The file metadata D3_FL may include parameters other than the above parameters, or may not include some of the above parameters. The same applies to the other pieces of metadata described below.

The backup ID FL1 is an identifier for identifying a backup. The host name FL2 is an identifier of a computer that uses backed up data (hereinafter referred to as target data). The file path FL3 describes a path to the target data. The update date FL4 is the last update date of the target data. The size FL5 is the size of the target data. The permissions FL6 defines permissions for the host computer to access the target data. The file type FL7 is the type of target data. The fingerprint FL8 is identification information that is generated from the target data to uniquely identify the target data, and is, for example, a hash value.

An example of the process metadata D3_PR will be described with reference to FIG. 7. The process metadata D3_PR includes, for example, a backup ID PR1, a host name PR2, and a process list PR3.

The backup ID PR1 and the host name PR2 are the same as the above-mentioned backup ID FL1 and the host name FL2, and therefore their explanations are omitted. Also in the following pieces of metadata, duplicate description of the backup ID and the host name is omitted. The process list PR3 is a list of processes that were activated when the backup was acquired.

FIG. 8 is an example of the user metadata D3_US. The user metadata D3_US includes, for example, a backup ID US1, a host name US2, a user name US3, a user ID US4, a primary group US5, and a secondary group US6.

FIG. 9 is an example of the listening port metadata D3_LP. The listening port metadata D3_LP includes, for example, a backup ID LP1, a host name LP2, and a port list LP3.

Figure 10:
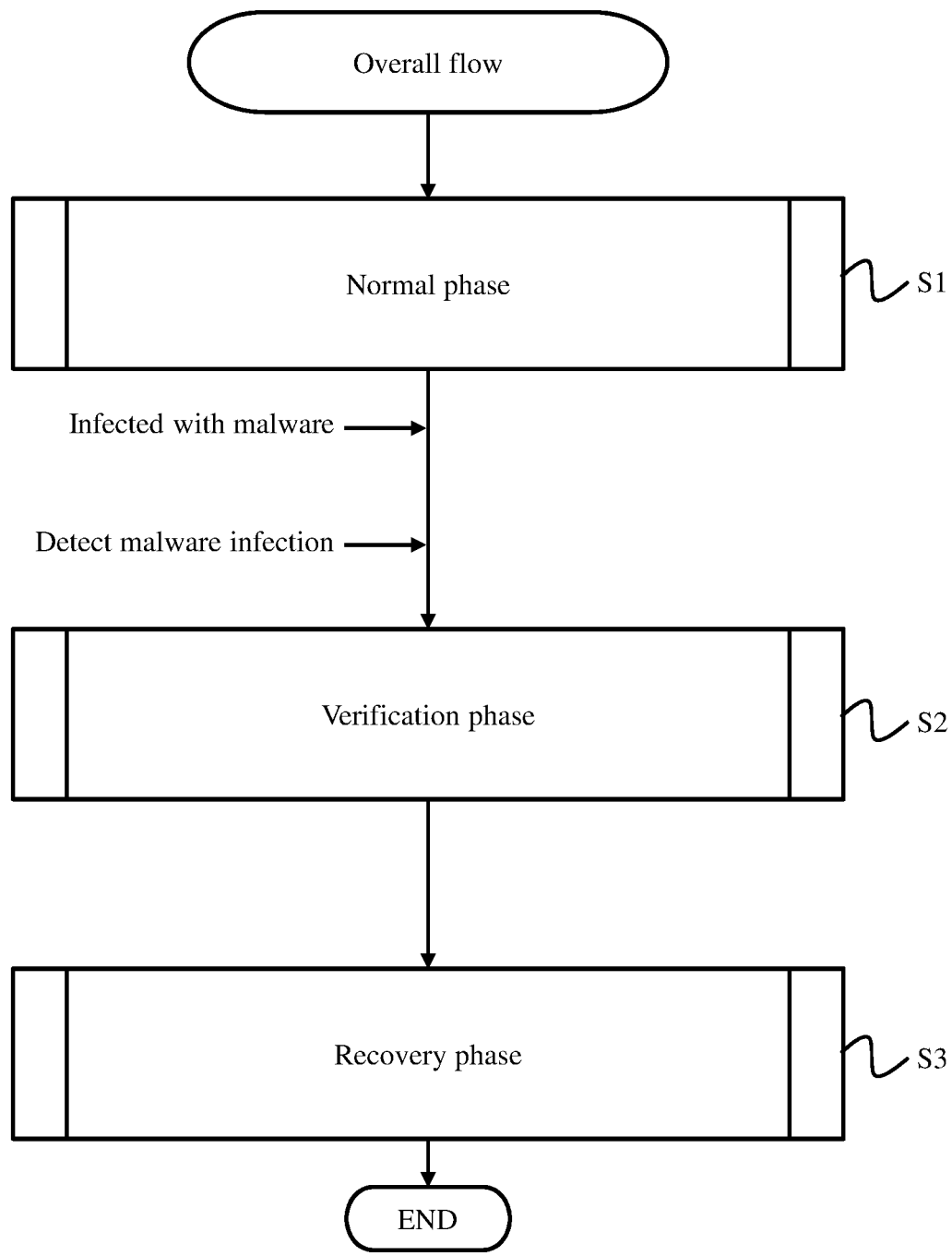
FIG. 10 is an overall flowchart illustrating an operation of the security system.

FIG. 10 illustrates an outline of the overall operation of the security system. The security system includes, for example, a normal phase S1, a verification phase S2, and a recovery phase S3. The normal phase S1 is processing of acquiring the metadata D3 for each backup generation and storing it in the data protection section 220 together with the backup image D1. The verification phase S2 is processing of extracting candidates for safe restoration that are not infected with malware when it is discovered that the backup is infected with malware. The recovery phase S3 is processing of selecting the latest backup from the backups which are the candidates for restoration and restoring it.

Figure 11:
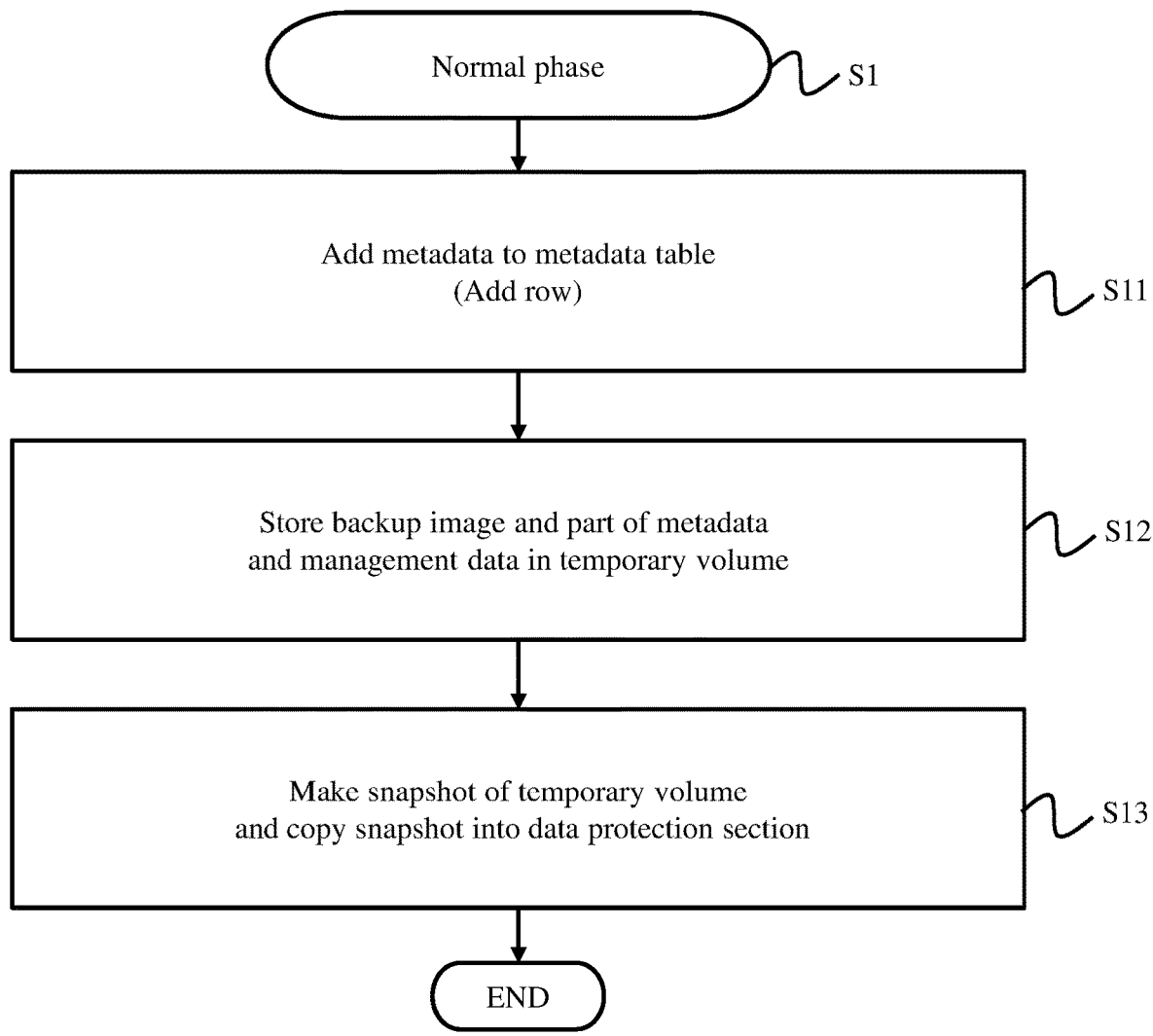
FIG. 11 is a flowchart of a normal phase.

FIG. 11 illustrates details of the normal phase S1. In the normal phase S1, the backup acquisition unit 110 adds a row for registering metadata to a metadata table (S11). Then, the backup acquisition unit 110 stores the backup image D1, the management data D2, and the metadata D3 in the temporary volume 240 (S12). Finally, the backup acquisition unit 110 causes the controller 20 of the storage system 2 to make a snapshot of the temporary volume 240 and copy the snapshot into the copy volume 221 in the data protection section 220 (S13).

Figure 12:
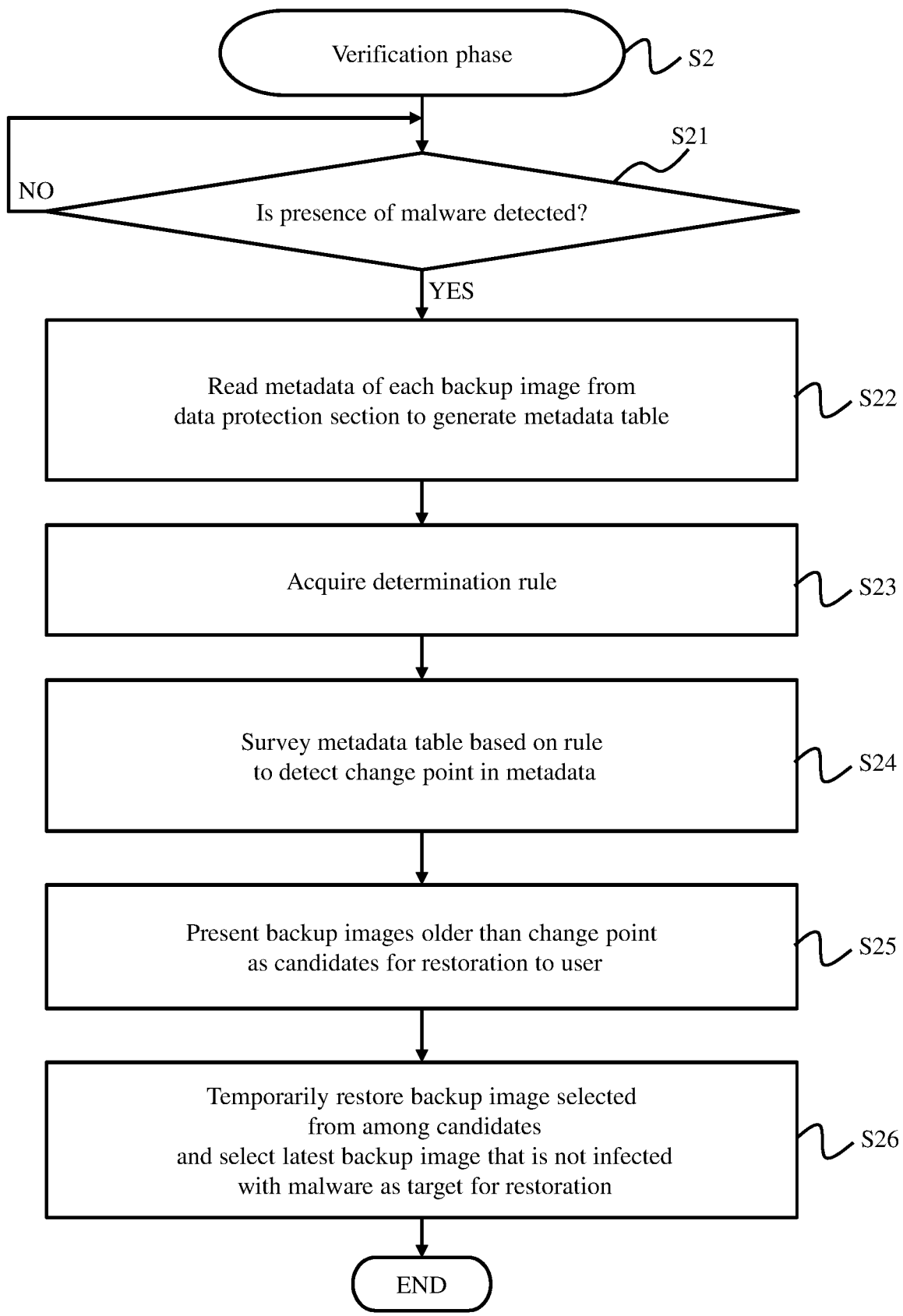
FIG. 12 is a flowchart of a verification phase.

FIG. 12 illustrates details of the verification phase S2. In the verification phase S2, when the presence of malware is detected (S21: YES), the metadata determination unit 120 reads the metadata D3 from each copy volume (snapshot volume) 221 in the data protection section 220, and forms a metadata table (S22). An example of the metadata table is as described in FIGS. 6 to 8.

Note that the presence of malware may be detected by the user, or may be automatically detected by a security check program. For example, the security check program is executed for the backup image or the business data in response to a decrease in the operation speed of the business computer 3 and/or a failure occurring in a screen display, thereby making it possible for the user to detect the presence of malware. The series of user's determination and operations can be replaced by a computer program.

The metadata determination unit 120 acquires a rule for determining whether there is a malware infection based on the malware information detected in step S21 (S23). The determination rule is a rule for determining whether there is a malware infection based on a change in the metadata parameter(s). The determination rule may be manually set in the metadata determination unit 120 by the user when the presence of malware is detected, or a plurality of determination rules may be set in advance by the user or another computer program before detection of malware.

The metadata determination unit 120 detects a change point at which the metadata parameter changes, based on the determination rule acquired in step S23 (S24). Then, the metadata determination unit 120 presents backup images D1 of the generations older than the change point as candidates for restoration to the user (S25).

The user reads the backup images presented as the candidates for restoration from the data protection section 220, temporarily restores them, and checks whether they are infected with malware by a security check program or the like. Then, the user selects the latest backup image from among backup images determined not to be infected with malware as a candidate for restoration (S26). The processing of step S26 can also be automated by a computer program.

Details of the recovery phase S3 are omitted. In the recovery phase S3, the backup computer 1 reads and restores the backup image D1 which is the candidate for restoration selected in step S26 and management data D2 from the data protection section 220, and stores the resulting data in a business data volume of a standby system (not illustrated) in the storage system 2. After that, the business computer 3 switches the access destination from the business data volume 210 in the production environment to the business data volume of the standby system.

According to the present embodiment configured as described above, even when the business data is infected with malware, only examining the differences between the pieces of metadata indicating the states of the pieces of backup data of the respective generations makes it possible to quickly extract backups which are candidates for restoration. Therefore, according to the present embodiment, it is not necessary to restore the backup images of the respective generations one by one and check whether there is an infection, and it is possible to restore the business processing in a short time and improve the quality of service at the time of failure.

Second Embodiment

A second embodiment will be described with reference to FIG. 13. In each embodiment described below, the difference from the first embodiment will be mainly focused on. In the present embodiment, the functions of the backup computer 1 is provided in a storage system 2A.

Figure 13:
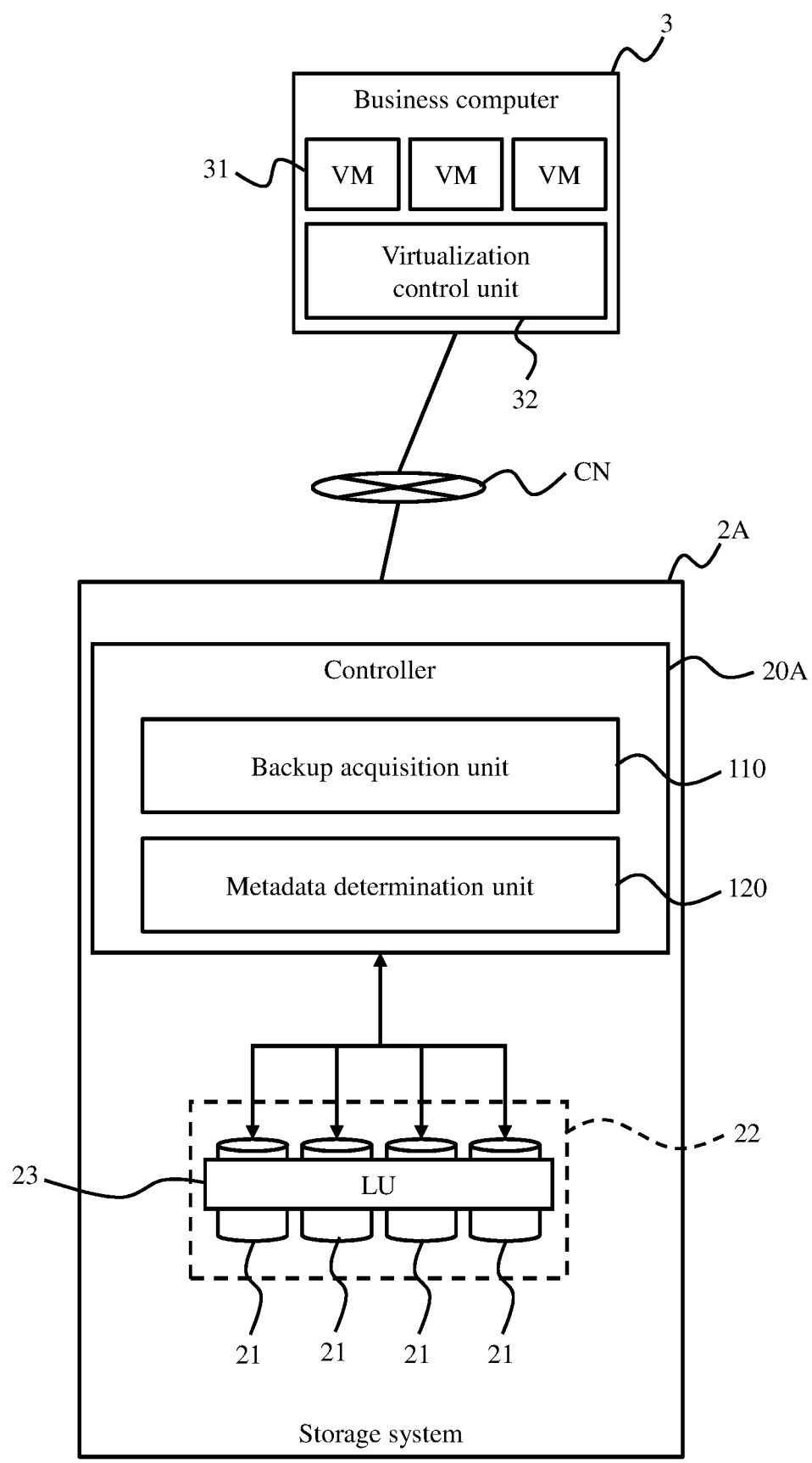
FIG. 13 is a system configuration diagram of a security system according to a second embodiment.

FIG. 13 is a configuration diagram of a security system according to the present embodiment. A controller 20A of the storage system 2A is provided with the backup acquisition unit 110 and the metadata determination unit 120.

The present embodiment having such a configuration also exhibits the same effects as the first embodiment. Furthermore, in the present embodiment, the functions of the backup computer 1 is provided in the storage system 2A, so that the configuration of the entire system can be simplified.

Third Embodiment

A third embodiment will be described with reference to FIG. 14. In the present embodiment, when a malware infection is detected, a determination rule is automatically selected and candidates from restoration are selected.

Figure 14:
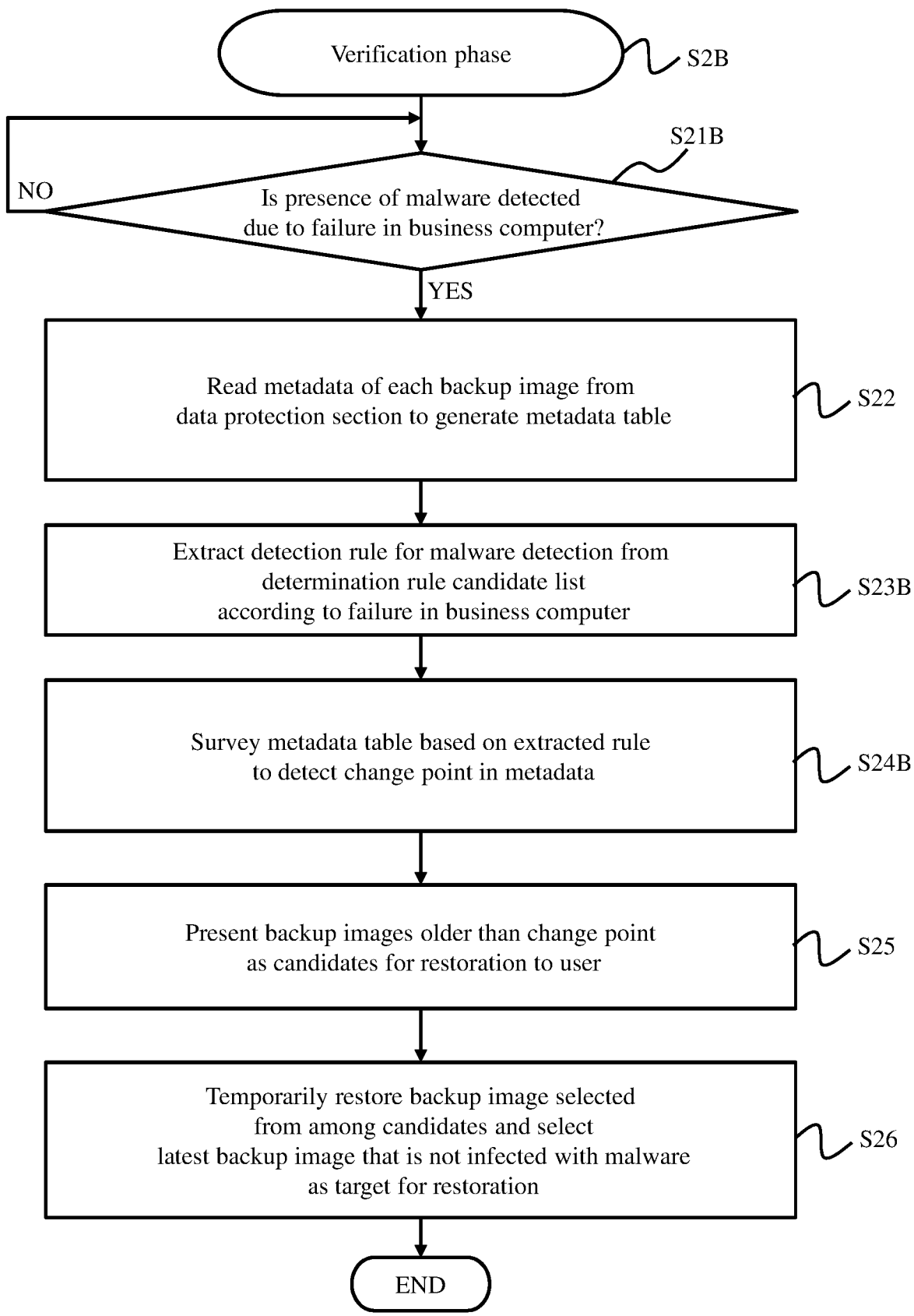
FIG. 14 is a flowchart of a verification phase according to a third embodiment.

FIG. 14 is a flowchart of a verification phase S2B executed by the security system of the present embodiment.

When the presence of malware is detected (S21B: YES) due to a failure in, for example, a processing speed or screen display occurring in the business computer 3, the metadata determination unit 120 reads the pieces of metadata of the respective generations from the data protection section 220 of the storage system 2 to generate a metadata table (S22), and acquires a determination rule corresponding to the failure in the business computer 3 from a determination rule candidate list (not illustrated) (S23B). In the determination rule candidate list, for example, one or more determination rules are associated in advance with failure events which may occur in the business computer 3.

The metadata determination unit 120 detects a change point at which the metadata in the metadata table changes, based on the determination rule extracted in step S23B (S24B). Then, the metadata determination unit 120 presents backup images of the generations older than the change point detected in step S24B as candidates for restoration to the user (S25).

The backup images specified by the user or a computer program is temporarily restored and checked for malware, and the safe and latest backup image is selected as the target for restoration (S26).

The present embodiment having such a configuration also exhibits the same effects as the first embodiment. Further, in the present embodiment, since the candidates for restoration can be extracted by automatically selecting the determination rule, it is possible to further improve the convenience for the user.

Fourth Embodiment

A fourth embodiment will be described with reference to FIG. 15. In the present embodiment, verification processing is executed within a normal phase S1C.

Figure 15:
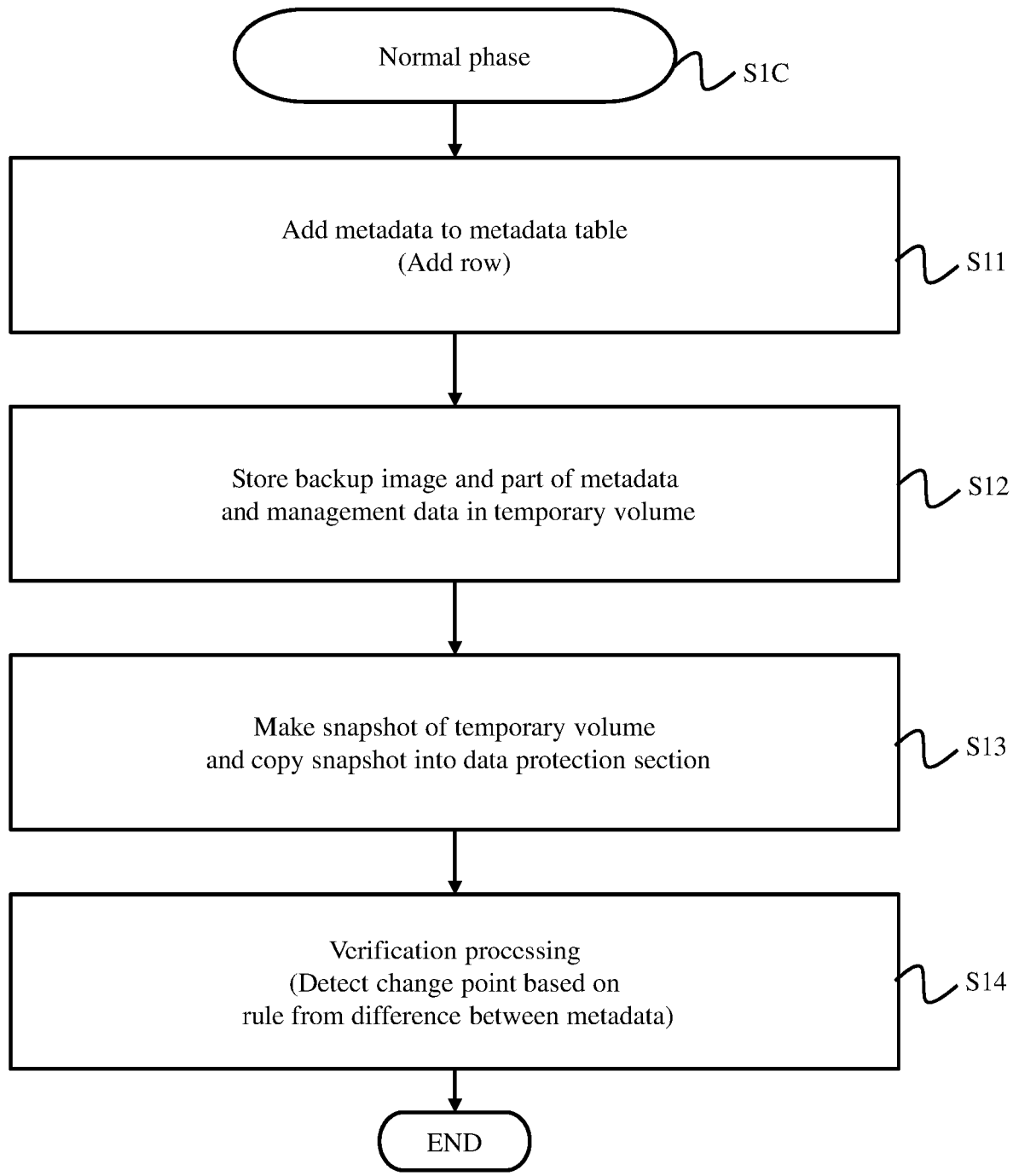
FIG. 15 is a flowchart of a normal phase according to a fourth embodiment.

FIG. 15 illustrates processing of the normal phase S1C executed by a security system of the present embodiment. After steps S11 to S13 described above, in the present embodiment, the verification processing described in the verification phase is executed (S14). Specifically, in the present embodiment, not only is the piece of metadata acquired for each backup generation, but also the differences from the pieces of metadata of the backups that have already been acquired are calculated based on the determination rule, and it is determined whether there is a malware infection from the change point.

The present embodiment having such a configuration also exhibits the same effects as the first embodiment. Furthermore, in the present embodiment, each time a backup is generated, the difference in metadata from the previous generation is calculated based on the determination rule, and the change point is detected. Therefore, it is more likely to detect a malware infection each time a backup is acquired, and it is possible to quickly deal with the malware.

Note that the present invention is not limited to the above embodiments. Those skilled in the art will be able to make various additions and changes within the scope of the present invention. The above embodiments are not limited to their configuration examples illustrated in the accompanying drawings. The configurations and the processing methods of the embodiments can be appropriately changed within the scope of achieving the object of the present invention.

Further, each constituent element of the present invention can be arbitrarily selected, and an invention having such a selected configuration is also included in the present invention. Furthermore, the configurations defined in the claims can be combined in addition to the combinations specified in the claims.

What is claimed is:

1. A security system comprising:
a first computer having data; and
a second computer including a processor programmed to:
store metadata indicating respective states of backup data of data of the first computer together with backup images generated from the backup data for a plurality of respective backup generations,
store a plurality of predetermined determination rules, each determination rule corresponding to an event of the first computer and each determination rule specifying a parameter of the metadata,
upon detecting an event of the first computer, automatically select a determination rule among the plurality of predetermined determination rules, based on the event detected of the first computer,
generate, determination information that indicates whether there is an abnormality in a current generation of backup data, based on a difference of the parameter of the metadata specified by the automatically selected determination rule among between the current generation of metadata and respective metadata of different backup generations, and
output the generated determination information.

2. The security system according to claim 1, wherein the parameter of each determination rule is based on a type of the backup data.

3. The security system according to claim 2,
wherein the processor is programmed to acquire the metadata before generation of the backup images from the backup data, and store in predetermined volumes together with the backup images.

4. The security system according to claim 3,
wherein the predetermined volumes for the respective backup generations are stored in a protected area where direct external access is prohibited.

5. The security system according to claim 4,
wherein the processor is programmed to couple, when the predetermined timing comes, the predetermined volumes to an access volume to read and acquire the metadata from the predetermined volumes.

6. The security system according to claim 1,
wherein the metadata includes information about a computer program included in the backup data.

7. The security system according to claim 6, wherein the processor is programmed to:
when storing the backup images, automatically select a determination rule among the plurality of predetermined determination rules, based on the event detected of the first computer.

8. A non-transitory computer-readable storage medium that stores a computer program that causes a first computer to function as a security system, the computer program causing the computer to execute steps comprising:
storing metadata indicating respective states of backup data of data of a second computer together with backup images generated from the backup data for a plurality of respective backup generations; and
storing a plurality of predetermined determination rules, each determination rule corresponding to an event of the second computer and each determination rule specifying a parameter of the metadata;
upon detecting an event of the second computer, automatically selecting a determination rule among the plurality of predetermined determination rules, based on the event detected of the second computer;
generating, determination information that indicates whether there is an abnormality in a current generation of backup data, based on a difference of the parameter of the metadata specified by the automatically selected determination rule between the current generation of metadata and respective metadata of different backup generations; and
outputting the generated determination information.

9. The storage medium according to claim 8,
wherein the parameter is based on a type of the backup data.

10. The storage medium according to claim 9,
wherein predetermined volumes for the respective backup generations are stored in a protected area where direct external access is prohibited.

11. A data diagnostic method of diagnosing safety of data used by a business computer, the data diagnostic method comprising:

storing metadata indicating respective states of backup data of the business computer together with backup images generated from the backup data for a plurality of respective backup generations;

storing a plurality of predetermined determination rules, each determination rule corresponding to an event of the business computer and each determination rule specifying a parameter of the metadata;

upon detecting an event of the business computer, automatically selecting a determination rule among the plurality of predetermined determination rules, based on the event detected of the business computer;

generating, determination information that indicates whether there is an abnormality in a current generation of backup data, based on a difference of the parameter of the metadata specified by the automatically selected determination rule between the current generation of metadata and respective metadata of different backup generations; and outputting the generated determination information.

* * * * *